US011062132B2

(12) United States Patent
Guzman et al.

(10) Patent No.: US 11,062,132 B2
(45) Date of Patent: Jul. 13, 2021

(54) SYSTEM AND METHOD FOR IDENTIFICATION OF MISSING DATA ELEMENTS IN ELECTRONIC DOCUMENTS

(71) Applicant: Vatbox, Ltd., Herzeliya (IL)

(72) Inventors: Noam Guzman, Ramat Hasharon (IL); Isaac Saft, Kfar Neter (IL)

(73) Assignee: Vatbox, Ltd., Herzeliya (IL)

( * ) Notice: Subject to any disclaimer, the term of this patent is extended or adjusted under 35 U.S.C. 154(b) by 0 days.

(21) Appl. No.: 16/379,145

(22) Filed: Apr. 9, 2019

(65) Prior Publication Data

US 2019/0236347 A1    Aug. 1, 2019

Related U.S. Application Data

(63) Continuation of application No. PCT/US2018/034129, filed on May 23, 2018.
(Continued)

(51) Int. Cl.
*G06K 9/00* (2006.01)
*G06F 40/10* (2020.01)
*G06F 40/205* (2020.01)
*G06F 40/279* (2020.01)
*G06Q 40/00* (2012.01)
*G06F 16/9032* (2019.01)
*G06F 16/908* (2019.01)

(52) U.S. Cl.
CPC ....... *G06K 9/00442* (2013.01); *G06F 16/908* (2019.01); *G06F 16/90332* (2019.01); *G06F 40/10* (2020.01); *G06F 40/205* (2020.01); *G06F 40/279* (2020.01); *G06Q 40/123* (2013.12)

(58) Field of Classification Search
CPC ........... G06K 9/00442; G06K 2209/01; G06F 40/10; G06F 40/205; G06F 40/279; G06F 16/90332; G06F 16/908; G06Q 40/123
See application file for complete search history.

(56) References Cited

U.S. PATENT DOCUMENTS 5,963,641 A * 10/1999 Crandall ................. G06F 40/20
380/2
6,363,376 B1 * 3/2002 Wiens .................... G06Q 10/10
(Continued)

OTHER PUBLICATIONS

International Search Report and Written Opinion of International Searching Authority for PCT/US2018/034129, ISA/RU, Moscow, Russia, dated Sep. 13, 2018.
(Continued)

*Primary Examiner* — Aaron W Carter
(74) *Attorney, Agent, or Firm* — M&B IP Analysts, LLC (57) ABSTRACT

A system and method for identifying missing required data elements in an electronic document. The method includes analyzing the electronic document to identify at least one data element; determining, based on the identified at least one data element and at least one electronic document requirement, whether there is at least one required data element missing from the electronic document; generating a query based on the identified at least one data element upon determining that there is at least one required data element missing from the electronic document; querying a database using the generated query; and modifying, based on a response to the query, the electronic document to include the at least one missing required data element.

23 Claims, 6 Drawing Sheets

Related U.S. Application Data (60) Provisional application No. 62/509,770, filed on May 23, 2017.

(56) References Cited

U.S. PATENT DOCUMENTS

| | | | |
|---|---|---|---|
| 7,269,407 B2 | 9/2007 | Carmon et al. | |
| 7,340,422 B2 | 3/2008 | Fisher | |
| 7,809,614 B2 | 10/2010 | Drehnen et al. | |
| 7,818,215 B2 | 10/2010 | King et al. | |
| 8,306,881 B2 | 11/2012 | Drehnen et al. | |
| 8,437,529 B1* | 5/2013 | Mennie | G06Q 40/00 382/135 |
| 8,775,277 B2 | 7/2014 | Beach et al. | |
| 8,880,417 B2 | 11/2014 | Hamper | |
| 10,387,561 B2* | 8/2019 | Guzman | G06F 16/93 |
| 2002/0059425 A1* | 5/2002 | Belfiore | G06F 9/54 709/226 |
| 2003/0158874 A1* | 8/2003 | Graham | G06Q 10/10 |
| 2004/0083426 A1* | 4/2004 | Sahu | G06F 40/174 715/224 |
| 2005/0055290 A1* | 3/2005 | Brass | G06Q 30/06 705/31 |
| 2007/0237427 A1* | 10/2007 | Patel | G06Q 40/02 382/305 |
| 2008/0133572 A1* | 6/2008 | Verhey-Henke | G16H 10/20 |
| 2008/0177465 A1* | 7/2008 | Barber | G01C 21/20 701/467 |
| 2008/0244382 A1* | 10/2008 | Petri | G06F 40/154 715/237 |
| 2009/0063450 A1* | 3/2009 | Petri | G06F 16/958 |
| 2009/0083247 A1* | 3/2009 | Cragun | G06F 16/245 |
| 2009/0254806 A1* | 10/2009 | Bitonti | G06F 16/81 715/234 |
| 2010/0182631 A1* | 7/2010 | King | G06Q 10/10 358/1.15 |
| 2010/0257066 A1 | 10/2010 | Jones et al. | |
| 2010/0299351 A1* | 11/2010 | Gatton | G06F 16/242 707/769 |
| 2012/0239644 A1* | 9/2012 | Vaananen | G06F 16/9537 707/723 |
| 2012/0290609 A1 | 11/2012 | Britt | |
| 2014/0258189 A1* | 9/2014 | Schmidt | G06F 16/2428 706/12 |
| 2014/0304127 A1 | 10/2014 | Stuart | |
| 2014/0358549 A1* | 12/2014 | O'Connor | G06F 9/44505 704/270 |
| 2015/0058185 A1 | 2/2015 | Hamper | |
| 2015/0106247 A1 | 4/2015 | Saft et al. | |
| 2015/0242832 A1 | 8/2015 | Corritori et al. | |
| 2015/0363893 A1 | 12/2015 | Saft et al. | |
| 2015/0363894 A1 | 12/2015 | Saft et al. | |
| 2016/0225101 A1* | 8/2016 | Saft | G06K 9/3233 |
| 2017/0032468 A1* | 2/2017 | Wang | G06Q 40/123 |
| 2017/0169292 A1* | 6/2017 | Guzman | G06K 9/00483 |
| 2017/0193608 A1* | 7/2017 | Guzman | G06F 40/131 |
| 2017/0242852 A1* | 8/2017 | Clain | G06F 9/451 |
| 2017/0262421 A1* | 9/2017 | Yue | H04L 63/0807 |
| 2018/0012268 A1* | 1/2018 | Simantov | G06K 9/00456 |
| 2018/0113908 A1* | 4/2018 | Moustafa | G06F 16/24534 |
| 2019/0026579 A1* | 1/2019 | Hall | G06K 9/03 |
| 2019/0236127 A1* | 8/2019 | Guzman | G06F 40/186 |
| 2019/0236347 A1* | 8/2019 | Guzman | G06F 40/10 |

OTHER PUBLICATIONS

Zhu et. al., "Scene Text Detection and Recognition: Recent Advances and Future Trends", Higher Education Press and Springer-Verlag Berlin Heidelberg, Jun. 2015, pp. 1-19.

\* cited by examiner

SYSTEM AND METHOD FOR IDENTIFICATION OF MISSING DATA ELEMENTS IN ELECTRONIC DOCUMENTS

CROSS-REFERENCE TO RELATED APPLICATIONS

This application is a continuation of International Application PCT/US2018/034129 filed May 23, 2018, which claims the benefit of U.S. Provisional Application No. 62/509,770 filed on May 23, 2017.

The contents of the above-referenced applications are hereby incorporated by reference.

TECHNICAL FIELD

The present disclosure relates generally to analyzing electronic documents, and more specifically to a system and method of identifying missing data elements within an electronic document and retrieving the missing data elements from a data source.

BACKGROUND

Enterprises all over the world often spend large amounts of money on goods and services purchased by the enterprises' employees in the course of their regular business dealings. Portions of these transactions may be refundable such that the enterprise can reclaim a value added tax (VAT) or deduct qualified expenses from their corporate income tax. These expenses often must be reported to the relevant tax authorities in order to reclaim a tax refund.

In some jurisdictions, enterprises may subtract the amount paid in VAT from a total tax amount owned to a tax authority by calculating any VAT paid by the enterprise for expenses that have a qualified business justification. The subtraction may occur without providing an original price of evidences, e.g., a tax receipt, for such expenses. However, an expense record may be required instead, which includes, for example, the expense amount, the name of the employee who participated in the transaction, the date of transaction, and the like.

In order to get the full tax reduction benefit for such business expenses, the documents supporting such transactions must include certain data elements that may differ from one jurisdiction to another. For example, a certain jurisdiction may require that each evidence include a date of transaction, a monetary amount of the transaction, the name and address of the party supplying the good or service, and the like. Where an evidence does not include a required element, the requested refund or deduction may be denied.

Currently, when a necessary element is missing from one or more evidences, e.g., expense records, the missing element must be identified and entered into the document. This can be time consuming for the entity reviewing the evidences, as well as for the parties of the transaction, if their input is required. For example, tracking down an employee who purchased a service may be difficult and time consuming. If they are located, they may not accurately remember the relevant details of the transaction. There are available solutions by which enterprises collect and analyze data associated with expenses and purchases made by their employees. However, such solutions do not provide an efficient method of both identifying missing data elements within an evidence and retrieving such elements in order to update the evidence.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "certain embodiments" may be used herein to refer to a single embodiment or multiple embodiments of the disclosure.

Certain embodiments disclosed herein include a method for identifying missing required data elements in an electronic document. The method includes analyzing the electronic document to identify at least one data element; determining, based on the identified at least one data element and at least one electronic document requirement, whether there is at least one required data element missing from the electronic document; generating a query based on the identified at least one data element upon determining that there is at least one required data element missing from the electronic document; querying a database using the generated query; and modifying, based on a response to the query, the electronic document to include the at least one missing required data element.

Certain embodiments disclosed herein also include a non-transitory computer readable medium having stored thereon instructions for causing a processing circuitry to perform a process. The process includes analyzing the electronic document to identify at least one data element; determining, based on the identified at least one data element and at least one electronic document requirement, whether there is at least one required data element missing from the electronic document; generating a query based on the identified at least one data element upon determining that there is at least one required data element missing from the electronic document; querying a database using the generated query; and modifying, based on a response to the query, the electronic document to include the at least one missing required data element.

Certain embodiments disclosed herein also include a system for identifying missing required data elements in an electronic document. The system includes a processing circuitry; and a memory, the memory containing instructions that, when executed by the processing circuitry, configure the system to: analyze the electronic document to identify at least one data element; determine, based on the identified at least one data element and at least one electronic document requirement, whether there is at least one required data element missing from the electronic document; generate a query based on the identified at least one data element upon determining that there is at least one required data element missing from the electronic document; query a database using the generated query; and modify, based on a response to the query, the electronic document to include the at least one missing required data element.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for identifying and retrieving required missing data elements in an electronic document. In an embodiment, an electronic document is retrieved and analyzed to determine if any data elements required for a particular task, such as a successful VAT refund, are missing. If one or more of such elements are determined to be missing, a database is accessed to identify these missing data elements and the electronic document is modified to include such elements.

Figure 1:
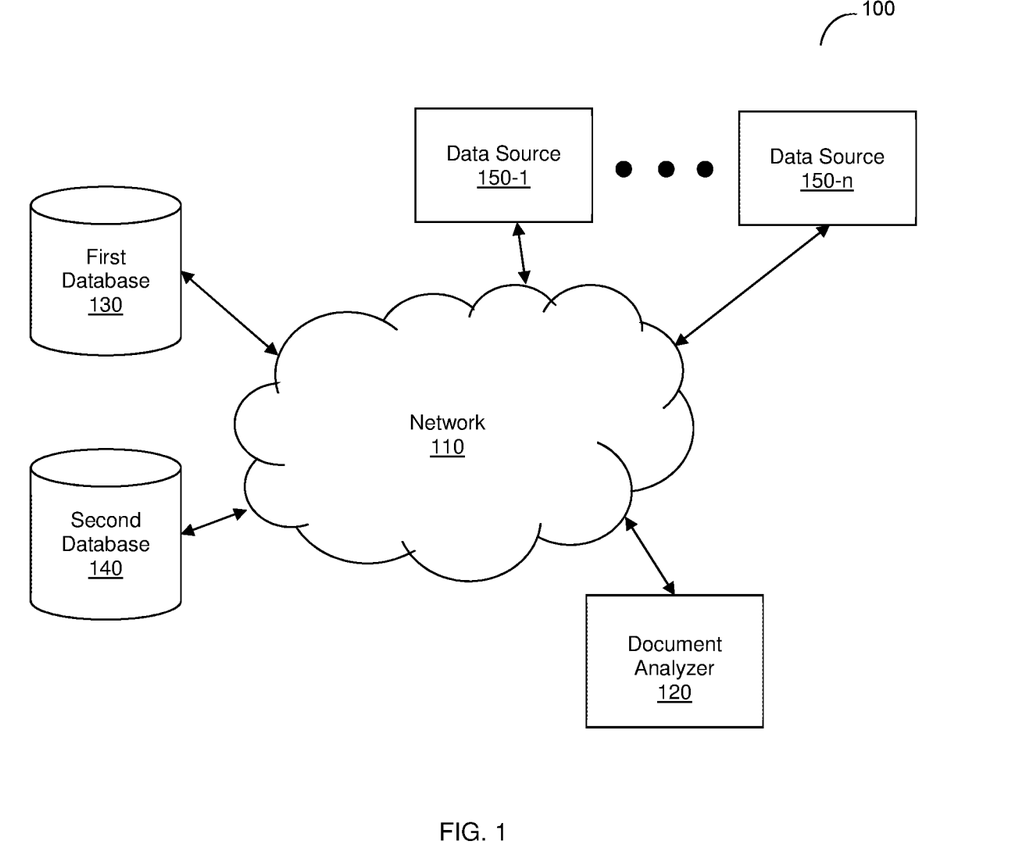
FIG. 1 is a network diagram utilized to describe the various disclosed embodiments.

FIG. 1 shows an example network diagram 100 utilized to describe the various disclosed embodiments. In the example network diagram 100, a document analyzer 120, a first database 130, a second database 140, and a plurality of data sources 150-1 through 150-n (hereinafter referred to individually as a data source 150 and collectively as data sources 150, merely for simplicity purposes), communicate via a network 110. The network 110 may be, but is not limited to, a wireless, cellular or wired network, a local area network (LAN), a wide area network (WAN), a metro area network (MAN), the Internet, the worldwide web (WWW), similar networks, and any combination thereof.

The first database 130 may be associated with an enterprise and is configured to store data related to transactions and purchases made by the enterprise or by representatives of the enterprise, as well as data related to the enterprise itself. The enterprise may be, but is not limited to, a business whose employees may purchase goods and services subject to VAT taxes while abroad. The first database 130 may be included in, but is not limited to, a server, an enterprise resource planning system, a customer relationship management (CRM) system, or any other system storing relevant data.

The first database 130 may further store documents representing transactions (e.g., expense records) that may be submitted by the enterprise to an external authority (e.g., as a VAT reclaim request form). The data stored by the first database 130 may further include, but is not limited to, evidences that support a business transaction, such as an image file showing a scan of an invoice, a tax receipt, a spreadsheet file, and the like. Each electronic document may include various data elements related to a transaction, e.g., an amount related to the transaction, such as a full or partial payment, a date of the transaction, a name of each of the parties to the transaction, details relating to goods or services exchanges during the transaction, and the like.

The data elements included in each of the electronic documents may be structured, semi-structured, unstructured, or a combination thereof. The structured or semi-structured data may be in a format that is not recognized by the document analyzer 120 and, therefore, may be treated as unstructured data.

The second database 140 may store data to be accessed by the document analyzer 120 to be utilized for determining missing required data elements. Such data may include, but is not limited to, previously prepared electronic documents, publicly available data describing vendors or suppliers, data including statistics related to specific types of transactions, e.g., travel expenses, office supply expenses, and the like. In an embodiment, these statistics include information about transactions engaged by third parties. For example, if 95% of all car rentals within a certain town are done with company A, such information may be used to determine if an expense record missing the name of a car rental company within that town are done using company A.

In an embodiment, the first database 130 and the second database 140 are realized as on single database. For example, an enterprise may have an internal server that contains both data related to transactions which have not yet been processed for a tax refund, such as purchase evidences, expense records, and so on, as well as electronic documents related to similar transactions which have been successfully processed for a tax refund, such as documents that are not missing any required data elements, statistics related to specific types of transaction, and the like.

The data sources 150 store information regarding required data elements. For example, the data sources 150 may include, but are not limited to, servers or databases of tax authority servers, accounting servers, reference websites, and the like, which indicate what information is necessary to successfully complete an application for a tax refund. As a non-limiting example, the data source 150 may be the website of the EU tax authority that contains a list of required data elements for a successful VAT refund. Required data elements are data elements that are necessary for a desired goal using the electronic document. For example, if the desired goal is a successful application for a VAT refund, a required data element is any data element that must be present within an electronic document to fulfill all of the requirements to successfully receive a VAT refund.

In an embodiment, the document analyzer 120 is configured to retrieve an electronic document, e.g., from the first database 130, and analyze the document, based on information from the data source 150, to determine if any data elements required for a successful VAT refund are missing. If one or more required data elements are determined to be missing, the document analyzer 120 is further configured to access the second database 140 to identify these missing data elements. For example, based on the analysis by the document analyzer 120, it is determined that an electronic expense record includes data elements indicating the date of the purchase, the country and the expense description, but that the name of the supplier is missing.

The document analyzer 120 may perform a search through, for example, the data source 150 that includes information with respect to one or more electronic document requirements. The electronic document requirements are used for determining whether the missing data element is a necessary data element based on the data elements that are present in the electronic expense record which provide at least partial information regarding a transaction. The electronic document requirements may depend on the type of electronic document, an intended use of the electronic document, or both. For example, for an electronic document to be used as an evidence of a transaction for a VAT refund, the electronic document requirements include regulatory requirements from a tax authority in an appropriate jurisdiction (e.g., a jurisdiction indicated as one of the data elements in the electronic document).

As a further example, an electronic expense record for a transaction does not include a supplier's name, which is determined to be a necessary element of a VAT request evidence. The expense record may be analyzed and determined to have been created on software registered to company A, and the subject of the transaction is determined to relate to a car rental transaction in London. The document analyzer 120 may query the second database 140, which includes historical information that indicates that, for 95% of the previous car rental transactions made by Company A's employees in London, AVIS® car rental was the supplier. In an alternate embodiment, the relationship of the parameters, e.g., the name of Company A, the location of London, a car rental transaction, and the likelihood of AVIS® as the supplier, is determined in real time by the document analyzer 120 as the electronic document is being analyzed. Thus, the missing required data element of the supplier name is determined to be AVIS®.

According to another example, an electronic document may include data elements that indicate that an employee's name associated with the transaction is David, and that the expense is associated with a bus ride. However, the amount of the transaction may be determined to be missing and required. The document analyzer 120 can process the employee's name and the expense description to generate a search query within a database to search for the employee's travel patterns. The document analyzer 120 may determine that the missing amount is 5.5 British pounds related to a bus ride that occurred on Jan. 10, 2016, by identifying that during the last 3 years David entered that amount next to bus ride expenses 20 times per month.

In an embodiment, the data elements within the electronic documents may be identified using machine vision indicating information related to a VAT reclaim request with respect to a transaction. The document analyzer 120 may be configured to create structured datasets based on electronic documents including data at least partially lacking a known structure (e.g., unstructured data, semi-structured data, or structured data having an unknown structure). To this end, the document analyzer 120 may be further configured to utilize optical character recognition (OCR) or other image processing to determine data in the electronic document. The document analyzer 120 may therefore include or be communicatively connected to a recognition processor (e.g., the recognition processor 235 of FIG. 2). According to another embodiment, the analysis may include using at least one machine learning technique to identify characters, symbols, and so on in the unstructured data. The machine learning techniques may include artificial neural networks, deep learning, decision tree learning, Bayesian networks, clustering, and the like.

In an embodiment, the document analyzer 120 is configured to analyze the created structured datasets to identify data elements related to transactions indicated in the electronic documents. In an embodiment, the document analyzer 120 is configured to create templates based on the created structured datasets. Each template is a structured dataset including the identified transaction parameters for a transaction.

In an embodiment, the document analyzer 120 is configured to create a template based on an electronic document. In a further embodiment, the document analyzer 120 may be configured to determine whether the transaction indicated in the electronic document is eligible for a VAT reclaim. In yet a further embodiment, the document analyzer 120 may be further configured to compare data of the template to at least one VAT reclaim requirement retrieved from, e.g., one of the data sources 150, based on the template. The VAT reclaim requirements may be in the form of, e.g., rules. For example, based on an electronic document showing a scan of a VAT reclaim request form for a purchase made in Germany, VAT reclaim requirements are retrieved from a German tax authority server. The retrieved VAT reclaim requirements include a requirement that the entity seeking the reclaim is not a German entity such that, if a "buyer country" field in the template indicates that the buyer is a German entity, the transaction is determined to be ineligible for VAT reclaim.

Using structured templates for determining whether evidencing electronic documents are required allows for more efficient and accurate determination than, for example, by utilizing unstructured data. Specifically, corresponding evidence requirement rules may be analyzed only with respect to relevant portions of a transaction electronic document (e.g., portions included in specific fields of a structured template), thereby reducing the number of instances of application of each rule as well as reducing false positives due to applying rules to data that is likely unrelated to each rule. Further, data extracted from electronic documents and organized into templates requires less memory than, for example, images of scanned documents.

A structured dataset template may be created based on the electronic document. Creating structured dataset templates based on electronic documents is described further herein and in U.S. patent application Ser. No. 15/361,934, assigned to the common assignee, the contents of which are hereby incorporated by reference.

In yet another embodiment, the document analyzer 120 may be further configured to validate the first electronic document based on templates. The validation may include, but is not limited to, determining whether the first electronic document is accurate and contains all of the required data elements for a successful tax refund (e.g., for a VAT, required data elements may include listing each of type of goods or services purchased, country of seller, country of buyer, and amount of VAT paid).

It should be noted that the embodiments described herein above with respect to FIG. 1 are described with respect to one first database 130 and one second database 140 merely for simplicity purposes and without limitation on the disclosed embodiments. Multiple databases 130, 104, or both, may be equally utilized without departing from the scope of the disclosure.

Figure 2:
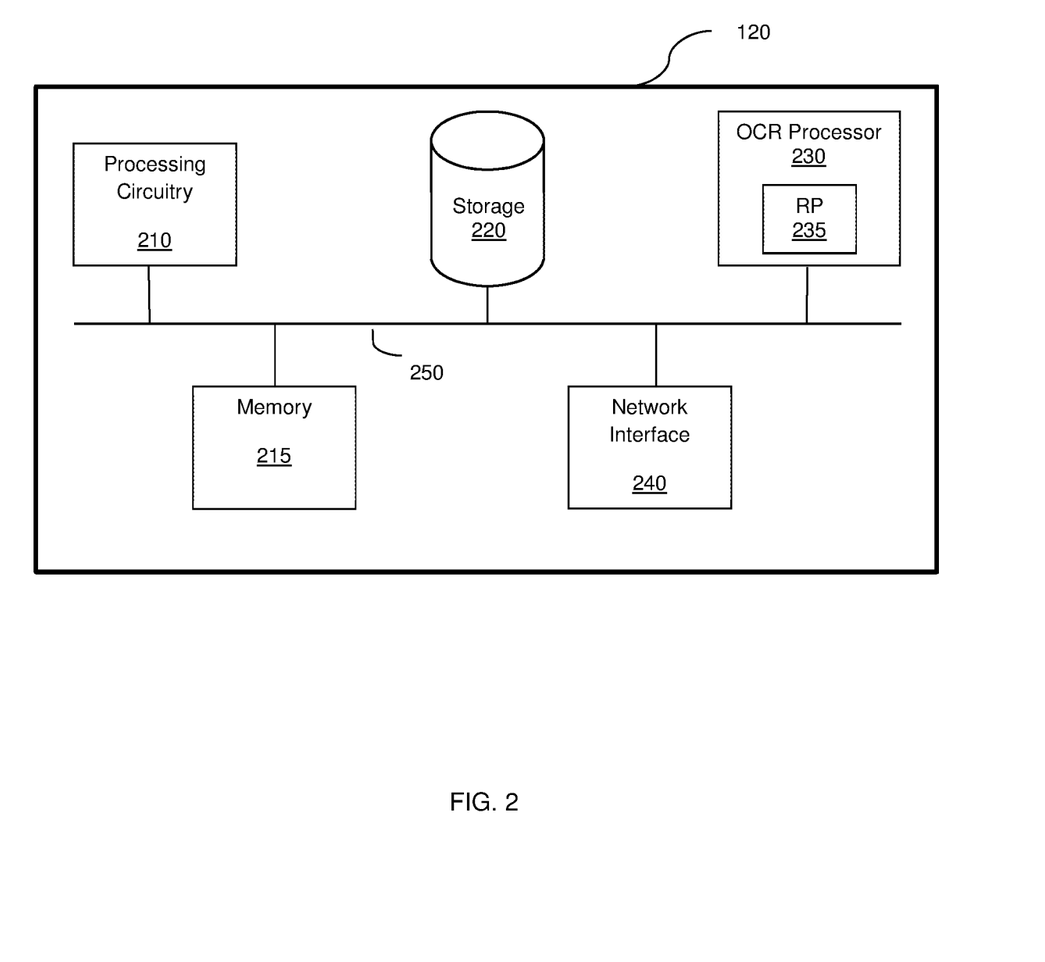
FIG. 2 is a schematic diagram of a document analyzer according to an embodiment.

FIG. 2 is an example schematic diagram of the document analyzer 120 according to an embodiment. The document analyzer 120 includes a processing circuitry 210 coupled to a memory 215, a storage 220, and a network interface 240. In an embodiment, the document analyzer 120 may include an optical character recognition (OCR) processor 230. In another embodiment, the components of the document analyzer 120 may be communicatively connected via a bus 250.

The processing circuitry 210 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 215 may be volatile (e.g., RAM, etc.), non-volatile (e.g., ROM, flash memory, etc.), or a combination thereof. In one configuration, computer readable instructions to implement one or more embodiments disclosed herein may be stored in the storage 220.

In another embodiment, the memory 215 is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 210, configure the processing circuitry 210 to perform the various processes described herein.

The storage 220 may be magnetic storage, optical storage, and the like, and may be realized, for example, as flash memory or other memory technology, CD-ROM, Digital Versatile Disks (DVDs), or any other medium which can be used to store the desired information.

The OCR processor 230 may include, but is not limited to, a feature and/or pattern recognition processor (RP) 235 configured to identify patterns, features, or both, in unstructured data sets. Specifically, in an embodiment, the OCR processor 230 is configured to identify at least characters in the unstructured data. The identified characters may be utilized to create a structured dataset including key fields and values.

The network interface 240 allows the document analyzer 120 to communicate with the first database 130, the database 140, the data sources 150, or a combination of, for the purpose of, for example, collecting metadata, retrieving data, storing data, and the like.

It should be understood that the embodiments described herein are not limited to the specific architecture illustrated in FIG. 2, and other architectures may be equally used without departing from the scope of the disclosed embodiments.

Figure 3:
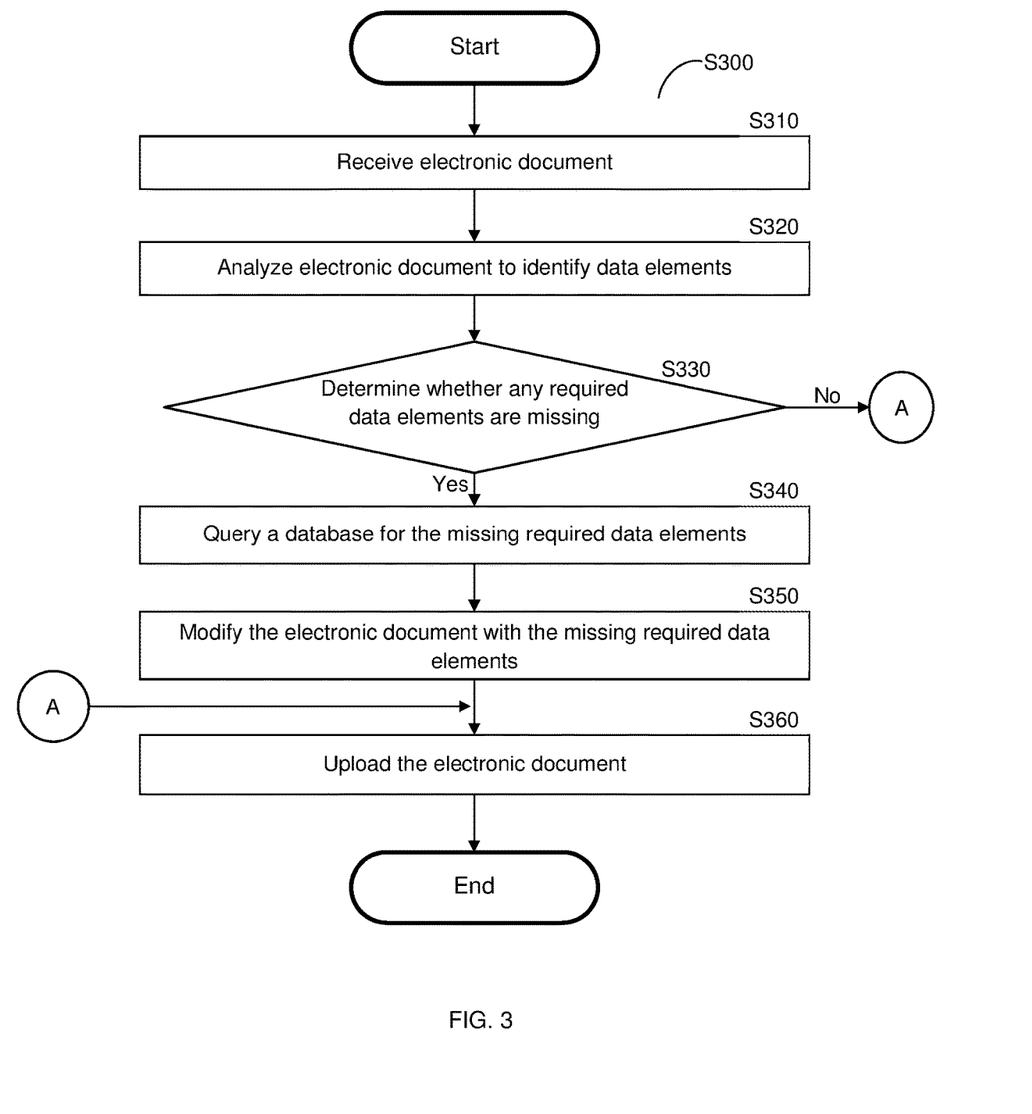
FIG. 3 is a flowchart illustrating a method for identifying missing data elements in an electronic document according to an embodiment.

FIG. 3 is an example flowchart 300 illustrating a method for identification of missing data elements within an electronic file according to one embodiment. At S310, the operation starts when an electronic document associated with a transaction made by, for example, an enterprise employee, is received. The electronic document may be collected from a database, e.g., the first database 130 of FIG. 1. The electronic document may be a scanned digital image of an expense record submitted by the enterprise employee that includes therein data elements as further described herein above with respect of FIG. 1. The transaction may be for a purchase of goods and services.

At S320, the electronic document is analyzed to identify data elements contained therein. The analysis may include using one or more computer vision techniques such as optical character recognition (OCR) that enables identifying characters, symbols, and so on in a dataset. Each data element is a piece of information included in the document and related to the transaction. The elements included in each of the electronic documents may be structured, semi-structured, unstructured, or a combination thereof.

At S330, it is determined whether one or more necessary data elements are missing from the electronic document with respect to electronic document requirements, where necessary data elements are data elements required for an intended use of the electronic document. For example, the electronic document requirements may be regulatory requirements of a tax authority when the electronic document is a scanned image of an invoice to be used as evidence for a VAT refund. According to an embodiment, the electronic document requirements may be collected from a data source 150 upon identification of at least one data element that indicates the country at which a transaction indicated in the electronic document was made. In case one or more data elements are missing, execution continues with S340; otherwise, execution continues with S360.

At S340, a database (e.g., the second database) is queried to identify the missing data elements based on the identified data elements. S340 may include generating a search query including one or more of the identified data elements as keywords of the search query. The database may include historical information associated with at least one of the plurality of data elements existing within the electronic document. For example, the historical information may include values for a specific data element, e.g., the name of a supplier of a particular part, of similar electronic documents stored within the database. Historical information may be extracted from a corresponding expense report, a database containing the historical data, and similar electronic documents that were previously analyzed. A query response is received, where the query response includes the missing data elements.

At S350, the electronic document is modified based on the identification of the missing one or more data elements. In an embodiment, the document is modified to include only the missing data elements. For example, if the original electronic document was missing the name of a supplier, and it is determined that the name of a supplier is a required data element, the electronic document is modified to include the name of the supplier provided by the query.

At optional S360, the electronic document is uploaded an external system. Examples for such systems include a tax authority server (e.g., one of the data sources 150, FIG. 1) or to an internal enterprise database (e.g., the first database 130, FIG. 1) for future use.

Figure 4:
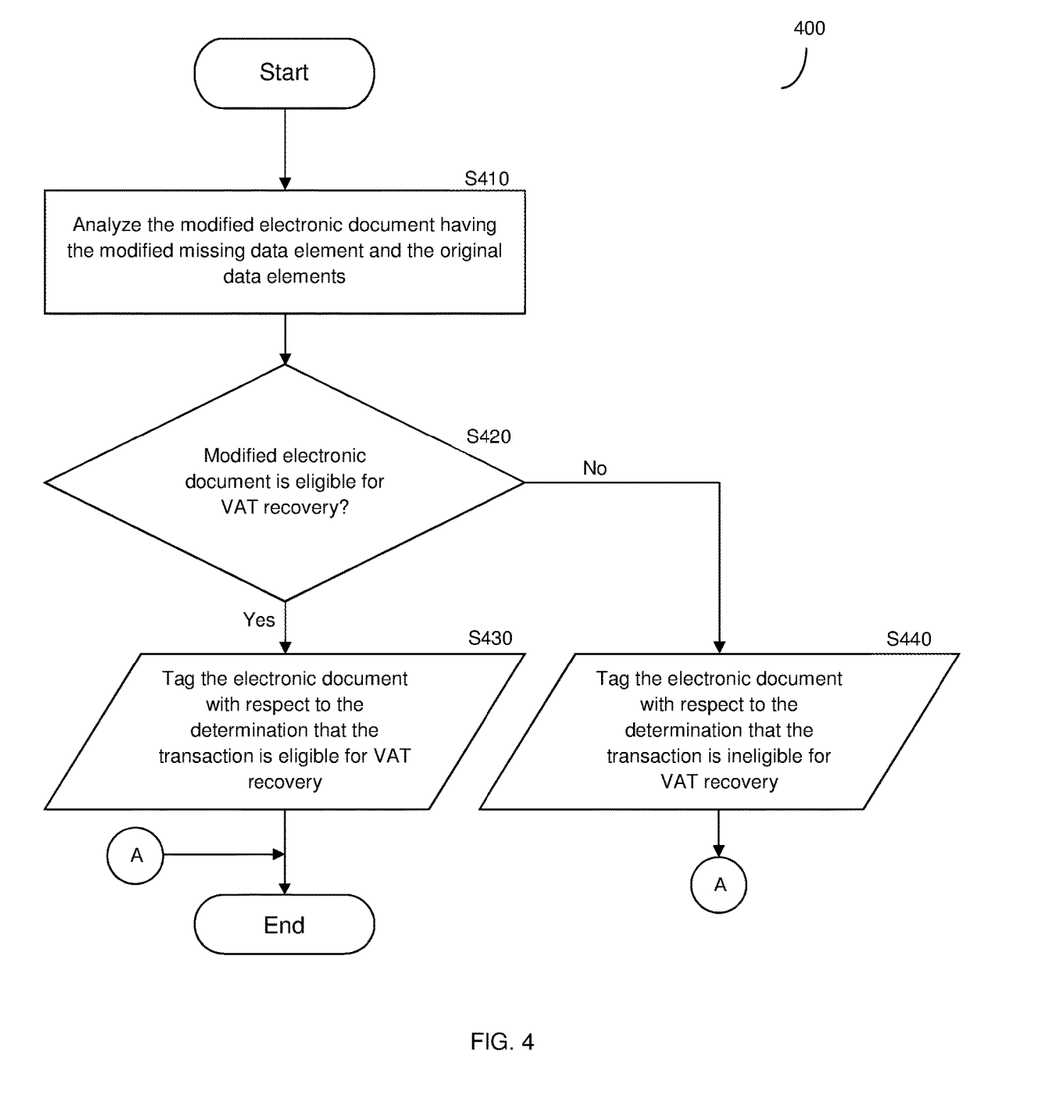
FIG. 4 is a flowchart illustrating a method for tagging an electronic document with respect to eligibility of a transaction related thereto for VAT recovery according to one embodiment.

FIG. 4 is an example flowchart 400 illustrating a method for tagging an electronic document with respect to eligibility of a transaction related thereto for VAT recovery according to one embodiment. In an embodiment, the electronic document is the electronic document uploaded at S360, FIG. 3.

At S410, a modified electronic document is analyzed to compare the identified previously missing necessary data element to the original data elements that were already present in the electronic document. The comparison may include comparing the historical information associated with each of the data elements of the completed electronic document. Based on the comparison, it is determined whether the identified data element that was missing from the original electronic document is the suitable data element.

According to another embodiment, the comparison allows for identifying errors in the original electronic document, such as wrong dates, amounts, etc. that were mistakenly entered by an employee.

At S420, it is determined whether the electronic document is eligible for a tax refund such as a VAT refund. If so, execution continues with S430; otherwise, execution continues with S440. The determination is achieved by analyzing the data elements of the electronic document with respect to the electronic document requirements. For example, the determination may include analyzing minimum requirements for a VAT refund, analyzing the electronic document to determine if at least the minimum requirements for a VAT refund are present, and if so, determining that the electronic document is eligible for a VAT refund. As a non-limiting example, it may be determined that the minimum requirements to receive a VAT refund based on an electronic record of a transaction should include the name of the supplier of a good or service, the date of service, and the amount of the transaction. If all three details are present within an electronic document, it may be determined that the document meets the minimum requirements and is therefore eligible for the refund. The electronic document requirements may be determined based on the plurality of data elements. For example, when the enterprise is located at London and the transaction relates to travel expense in London the regulatory tax requirements relate to domestic tax requirements.

At S430, upon determination that the electronic document is eligible for VAT recovery, the electronic document is tagged. The tagging may include adding an indicator of eligibility to metadata of the electronic document. At S440, upon determination that the electronic document is ineligible for VAT recovery, the electronic document is tagged respectively.

Figure 5:
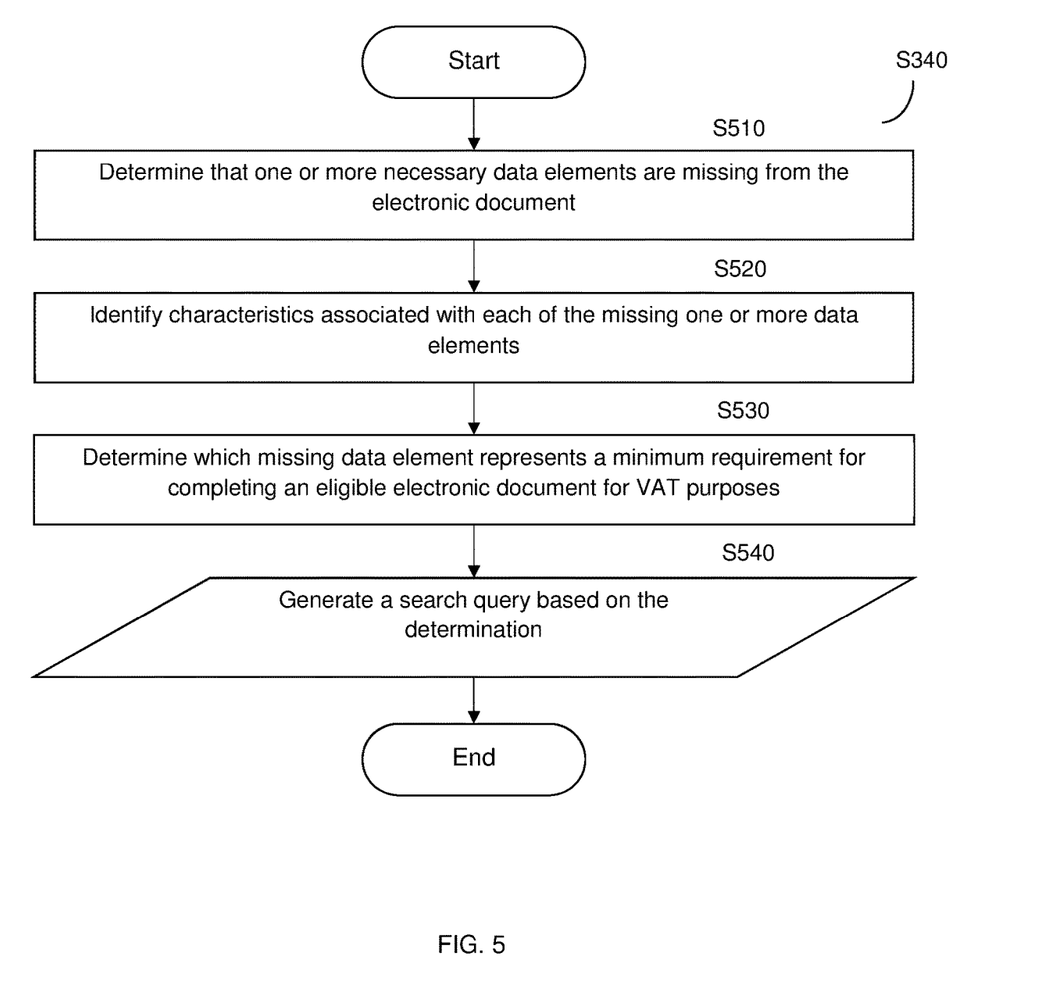
FIG. 5 is a flowchart illustrating a method for generating an optimal search query for completing an ineligible electronic document according to an embodiment.

FIG. 5 is an example flowchart illustrating a method for generating an optimal search query for completing an ineligible electronic document according to an embodiment. At S510, it is determined if one or more data elements are missing from the electronic document. For example, the electronic document may not include the transaction type, i.e., expense type, the transaction amount, the supplier's name, and the like. In an embodiment, the determination may be performed as described with respect to S330, FIG. 3.

At S520, characteristics associated with each of the missing data elements are identified. The characteristics are properties that may be indicative of the type of the missing data element. For example, an empty field is identified next to a percentage symbol "%", it may be determined that the missing data element is the VAT amount. Thus, the symbol "%" may be one of the characteristics of the VAT amount field, i.e. data element.

At S530, it is determined which one of the missing data elements represents a minimum requirement for completing an eligible electronic document for VAT purposes. For example, the supplier's name, the document type and the transaction amount are missing from an electronic document. It may be determined that if the document type is identified the options for completing the supplier's name, i.e. the missing data element, are ten options. If the amount is identified, the option for completing the supplier's name, i.e. the missing data element, is one single option. Hence, it may be determined that in this exemplary case the required data element that may facilitate modifying an eligible electronic document for VAT purposes is the transaction amount.

At S540, a search query based of the determination made at step S530 is generated. The search query may include one or more keywords as further described herein above with respect of FIG. 1.

Figure 6:
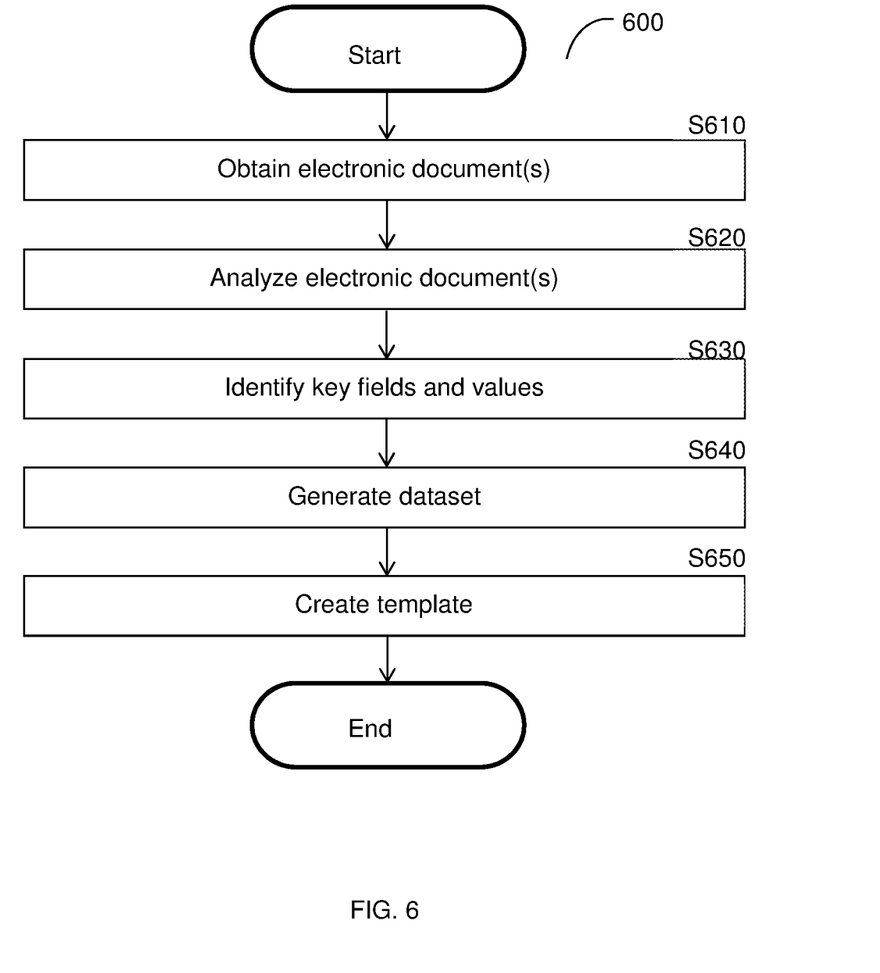
FIG. 6 is a flowchart illustrating a method for creating a structured dataset template based on an electronic document according to an embodiment.

FIG. 6 is an example flowchart illustrating a method for creating a structured dataset template based on an electronic document according to an embodiment.

At S610, the electronic document is obtained. Obtaining the electronic document may include, but is not limited to, receiving the electronic document (e.g., receiving a scanned image) or retrieving the electronic document (e.g., retrieving the electronic document from an enterprise system, a merchant enterprise system, or a database).

At S620, the electronic document is analyzed. The analysis may include, but is not limited to, using optical character recognition (OCR) to determine characters in the electronic document.

At S630, based on the analysis, key fields and values in the electronic document are identified. The key field may include, but are not limited to, merchant's name and address, date, currency, good or service sold, a transaction identifier, an invoice number, and so on. An electronic document may include unnecessary details that would not be considered to be key values. As an example, a logo of the merchant may not be required and, thus, is not a key value. In an embodiment, a list of key fields may be predefined, and pieces of data that may match the key fields are extracted. Then, a cleaning process is performed to ensure that the information is accurately presented. For example, if the OCR would result in a data presented as "1211212005", the cleaning process will convert this data to Dec. 12, 2005. As another example, if a name is presented as "Mo$den", this will change to "Mosden". The cleaning process may be performed using external information resources, such as dictionaries, calendars, and the like.

In a further embodiment, it is checked if the extracted pieces of data are completed. For example, if the merchant name can be identified but its address is missing, then the key field for the merchant address is incomplete. An attempt to complete the missing key field values is performed. This attempt may include querying external systems and databases, correlation with previously analyzed invoices, or a combination thereof. Examples for external systems and databases may include business directories, Universal Product Code (UPC) databases, parcel delivery and tracking systems, and so on. In an embodiment, S630 results in a complete set of the predefined key fields and their respective values.

At S640, a structured dataset is generated. The generated structured dataset includes the identified key fields and values.

At S650, based on the structured dataset, a template is created. The created template is a data structure including a plurality of fields and corresponding values. The corresponding values include transaction parameters identified in the structured dataset. The fields may be predefined.

In an embodiment, creating the template includes analyzing the structured dataset to identify transaction parameters such as, but not limited to, at least one entity identifier (e.g., a consumer enterprise identifier, a merchant enterprise identifier, or both), information related to the transaction (e.g., a date, a time, a price, a type of good or service sold, etc.), or both. In a further embodiment, analyzing the structured dataset may also include identifying the transaction based on the structured dataset.

Creating templates from electronic documents allows for faster processing due to the structured nature of the created templates. For example, query and manipulation operations may be performed more efficiently on structured datasets than on datasets lacking such structure. Further, organizing information from electronic documents into structured datasets, the amount of storage required for saving information contained in electronic documents may be significantly reduced. Electronic documents are often images that require more storage space than datasets containing the same information. For example, datasets representing data from 100,000 image electronic documents can be saved as data records in a text file. A size of such a text file would be significantly less than the size of the 100,000 images.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for identifying missing required data elements in an electronic document, comprising:
    analyzing the electronic document to identify at least one data element;
    determining, based on the identified at least one data element and at least one electronic document requirement, at least one missing required data element for completing an eligible electronic document that is missing from the electronic document based on a structured template;
    generating a query based on the identified at least one data element and the at least one missing required data element from the electronic document;
    querying a database separately from where the electronic document is stored using the generated query; and
    modifying, based on a response to the query, the electronic document to include the at least one missing required data element to form the eligible electronic document.

2. The method of claim 1, wherein the at least one required data element is determined based on at least one data source containing electronic document requirements, and wherein the at least one required data element is necessary for a successful application for a tax refund.

3. The method of claim 2, wherein the at least one data source is at least one of: a tax authority server, a reference website, a tax information database, and an accounting server.

4. The method of claim 1, wherein the database includes at least one of: previously prepared electronic documents, vendor data, supplier data, and data related to specific types of transactions.

5. The method of claim 1, further comprising:
    creating a structured dataset based on the electronic document.

6. The method of claim 5, wherein the at least one data element includes at least one of: structured data, semi-structured data, and unstructured data.

7. The method of claim 1, wherein analyzing the electronic document includes using machine vision to identify the at least one data elements.

8. The method of claim 1, wherein the analyzing includes optical character recognition (OCR) that enables identifying characters or symbols in the electronic document.

9. The method of claim 1, wherein the query includes at least one data element as a keyword of a search query.

10. The method of claim 1, further comprising:
    uploading the modified electronic document to an external system, wherein the external system is any one of: a tax authority server and an internal enterprise database.

11. The method of claim 1, further comprising:
    tagging the modified electronic document as eligible if no required data elements are determined to be missing from the modified electronic document.

12. A non-transitory computer readable medium having stored thereon instructions for causing a processing circuitry to perform a process, the process comprising:
    analyzing the electronic document to identify at least one data element;
    determining, based on the identified at least one data element and at least one electronic document requirement, at least one missing required data element for completing an eligible electronic document that is missing from the electronic document;
    generating a query based on the identified at least one data element and the at least one missing required data element from the electronic document;
    querying a database separately from where the electronic document is stored using the generated query; and
    modifying, based on a response to the query, the electronic document to include the at least one missing required data element to form the eligible electronic document.

13. A system for identifying missing required data elements in an electronic document, comprising:
    a processing circuitry; and
    a memory, the memory containing instructions that, when executed by the processing circuitry, configure the system to:

analyze the electronic document to identify at least one data element;

determine, based on the identified at least one data element and at least one electronic document requirement, at least one missing required data element for completing an eligible electronic document that is missing from the electronic document based on a structured template;

generate a query based on the identified at least one data element and the at least one missing required data element from the electronic document;

query a database separately from where the electronic document is stored using the generated query; and modify, based on a response to the query, the electronic document to include the at least one missing required data element to form the eligible electronic document.

14. The system of claim 13, wherein the at least one required data element is determined based on at least one data source containing electronic document requirements, and wherein the at least one required data element is necessary for a successful application for a tax refund.

15. The system of claim 14, wherein the at least one data source is at least one of: a tax authority server, a reference website, a tax information database, and an accounting server.

16. The system of claim 13, wherein the database includes at least one of: previously prepared electronic documents, vendor data, supplier data, and data related to specific types of transactions.

17. The system of claim 13, wherein the system is further configured to:
create a structured dataset based on the electronic document.

18. The system of claim 17, wherein the at least one data element includes at least one of: structured data, semi-structured data, and unstructured data.

19. The system of claim 13, wherein analyzing the electronic document includes using machine vision to identify the at least one data elements.

20. The system of claim 13, wherein the analyzing includes optical character recognition (OCR) that enables identifying characters or symbols in the electronic document.

21. The system of claim 13, wherein the query includes at least one data element as a keyword of a search query.

22. The system of claim 13, wherein the system is further configured to:
upload the modified electronic document to an external system, wherein the external system is any one of: a tax authority server and an internal enterprise database.

23. The system of claim 13, wherein the system is further configured to:
tag the modified electronic document as eligible if no required data elements are determined to be missing from the modified electronic document.

* * * * *